United States Patent
Kobayashi

[11] Patent Number: 6,074,317
[45] Date of Patent: Jun. 13, 2000

[54] BELT FOR CONTINUOUSLY VARIABLE TRANSMISSION WITH SUPPRESSED SLIP RELATIVE TO THE PULLEYS

[75] Inventor: Daisuke Kobayashi, Yokohama, Japan

[73] Assignee: Nissan Motor Co., Ltd., Yokohama, Japan

[21] Appl. No.: 08/973,469

[22] PCT Filed: Jul. 29, 1997

[86] PCT No.: PCT/JP97/02614

§ 371 Date: Dec. 16, 1997

§ 102(e) Date: Dec. 16, 1997

[87] PCT Pub. No.: WO98/04847

PCT Pub. Date: Feb. 5, 1998

[30] Foreign Application Priority Data

Jul. 30, 1996 [JP] Japan ................................. 8-200449

[51] Int. Cl.[7] ...................................................... F16G 1/00
[52] U.S. Cl. ........................... 474/201; 474/202; 474/242
[58] Field of Search .................... 474/201, 202, 474/242

[56] References Cited

U.S. PATENT DOCUMENTS

| | | | |
|---|---|---|---|
| 3,720,113 | 3/1973 | Van Doorne | 474/242 |
| 4,303,403 | 12/1981 | Lamers | 474/201 |
| 4,338,081 | 7/1982 | Hattori et al. | 474/201 |
| 4,465,469 | 8/1984 | Cataldo | 474/201 |
| 4,618,337 | 10/1986 | Okawa et al. | 474/201 |
| 4,676,768 | 6/1987 | Miranti et al. | 474/201 |
| 4,790,798 | 12/1988 | Hattori | 474/242 |
| 4,824,424 | 4/1989 | Ide et al. | 474/242 |
| 4,826,473 | 5/1989 | Miyawaki | 474/240 |
| 4,906,225 | 3/1990 | Van Lith | 474/242 |
| 5,019,020 | 5/1991 | Van Lith | 474/240 |
| 5,152,722 | 10/1992 | Yamada | 474/240 |
| 5,236,401 | 8/1993 | Matsuo | 474/242 |

FOREIGN PATENT DOCUMENTS

| | | | |
|---|---|---|---|
| 55-100443 | 7/1980 | Japan . | |
| 6-129494 | 5/1994 | Japan | F16G 5/16 |

*Primary Examiner*—David M. Fenstermacher
*Attorney, Agent, or Firm*—Foley & Lardner

[57] ABSTRACT

A belt for a continuously variable transmission includes a rigid ring. A plurality of adjacent rigid first elements are supported on the ring. Each element has first and second surfaces facing forward and rearward of the element in a direction of rotation of the ring, a first locking edge formed at the first surface, and a second locking edge formed at the second surface. The first surface includes a first inclined face extending radially inward of the first locking edge so that a thickness of the element gradually decreases in a radially inward direction, and a first radially outward face extending radially outward of the first locking edge. The second surface includes a second face extending radially inward of the locking edge and a second radially outward face extending radially outward of the second locking edge. The second face is depressed relative to the second radially outward face so that the thickness of the element is smaller at the second face than at the second radially outward face. The second locking edge is located radially outward of the first locking edge and can contact the first surface of the adjacent element. Accordingly, the adjacent elements are inclinable relative to each other so that the belt passes smoothly on the pulleys.

8 Claims, 14 Drawing Sheets

AXIAL DIRECTION

RADIALLY OUTWARD DIRECTION

FRONT

AXIAL DIRECTION $\theta 2' > \theta 3$

6,074,317

BELT FOR CONTINUOUSLY VARIABLE TRANSMISSION WITH SUPPRESSED SLIP RELATIVE TO THE PULLEYS

TECHNICAL FIELD

This invention relates to improvements in a belt for a continuously variable transmission of the type wherein the belt is passed on drive and driven pulleys to accomplish power transmission from the drive pulley to the driven pulley, more particularly to the improvements to prevent the belt from slipping relative to the pulleys.

BACKGROUND ART

A variety of belts have been proposed and put into practical use for a continuously variable transmission of the type wherein the belt is passed on drive and driven pulleys. A typical one of such belts includes an endless (loop-shaped) steel belt or cylindrical ring which is formed by laminating a plurality of endless steel sheets. A plurality of steel elements are supported on the ring in a manner to be aligned along the periphery of the ring so that the adjacent ones are contactable with each other. Each pulley includes axially movable and fixed wheel counterparts which are coaxial with and face each other to define therebetween a pulley groove. The axially movable wheel counterpart is axially movable under an axial thrust of a controlled hydraulic pressure so as to change the width of the pulley groove. The belt is put in the pulley groove in such a manner that the opposite side edge faces of each element are in frictional contact with the frustoconical surfaces of the respective movable and fixed wheel counterparts of each pulley.

However, the following drawbacks have been encountered in such a conventional belt: That is, an initial clearance is produced between the adjacent elements when the belt has been assembled. Additionally, the steel ring of the belt is extendable under a tension applied to the belt when the transmission is operated upon the belt being passed on the drive and driven pulleys. As a result, a slip has been unavoidably generated between the belt and the drive and driven pulleys. This degrades the durability of the belt while lowering a power transmission efficiency of the continuously variable transmission.

DISCLOSURE OF INVENTION

It is an object of the present invention to provide an improved belt for a continuously variable transmission, which can effectively overcome drawbacks encountered in conventional belts for a continuously variable transmission of the same type.

Another object of the present invention is to provide an improved belt for a continuously variable transmission, which is high in durability while improving a power transmission efficiency of the transmission.

A further object of the present invention is to provide an improved belt for a continuously variable transmission, which can effectively suppress a slip of a belt relative to a pulley of the transmission regardless of a changing transmission ratio of the transmission.

A belt of the present invention is for a continuously variable transmission and comprises a rigid ring. A plurality of rigid first elements are supported on the ring and aligned in a peripheral direction of the ring to be adjacent to each other. Each element has first and second surfaces which respectively face forward and rearward of the element in a direction of rotation of the ring, a first locking edge formed at the first surface, and a second locking edge formed at the second surface. The first and second surfaces of the respective adjacent elements are contactable with each other. The first surface includes a first inclined face formed radially inward of the first locking edge and extending radially inward from the first locking edge so that thickness of the element gradually decreases in a radially inward direction, and a first radially outward face formed radially outward of the first locking edge and extending radially outward from the first locking edge. The second surface includes a second face formed radially inward of the locking edge and extending radially inward from the second locking edge, and a second radially outward face extending radially outward of the second locking edge and extending radially outward from the second locking edge. The second face is depressed relative to the second radially outward face so that the thickness of the element is smaller at the second face than that at the second radially outward face. The second locking edge is located radially outward of the first locking edge and contactable with the first surface of the adjacent element. Accordingly, the adjacent ones of the elements are inclinable relative to each other so that the belt is smoothly passed on pulleys of the continuously variable transmission.

According to the present invention, the effective thickness (or the pitch between the working locking edges of the adjacent elements) of each element of the belt in a bent state can be reduced relative to that in a straight state during operation of the belt at any transmission ratios of the transmission, and therefore the circumference (at the radial level of the effective thickness of elements) of the circularly arranged elements of the belt increases proportionally to the number of the elements which are aligned in the straight state. As a result, a clearance formed between the adjacent elements owing to the initial clearance and extension of the ring can be effectively reduced during the operation of the belt. This effectively suppresses slip of the belt relative to the pulley, thus improving the power transmission efficiency and the durability of the belt.

BEST MODE FOR CARRYING OUT THE INVENTION

To facilitate understanding of the present invention, a brief reference will be made to conventional belts for a continuously variable transmission (CVT), depicted in FIGS. 11 to 20. Referring to FIGS. 11 to 15B, a conventional belt 1' for the continuously variable transmission is shown including a laminated ring 3 which is formed by laminating a plurality of endless or annular steel sheets 3a to 3n. A plurality of generally wedge-shaped elements 2' are supported on the laminated ring 3 and aligned along the longitudinal or peripheral direction of the laminated ring 3 so that the adjacent ones are contactable with each other. Such a conventional belt 1' is disclosed, for example, in Japanese Patent Provisional Publication No. 55-100443.

Figure 12:
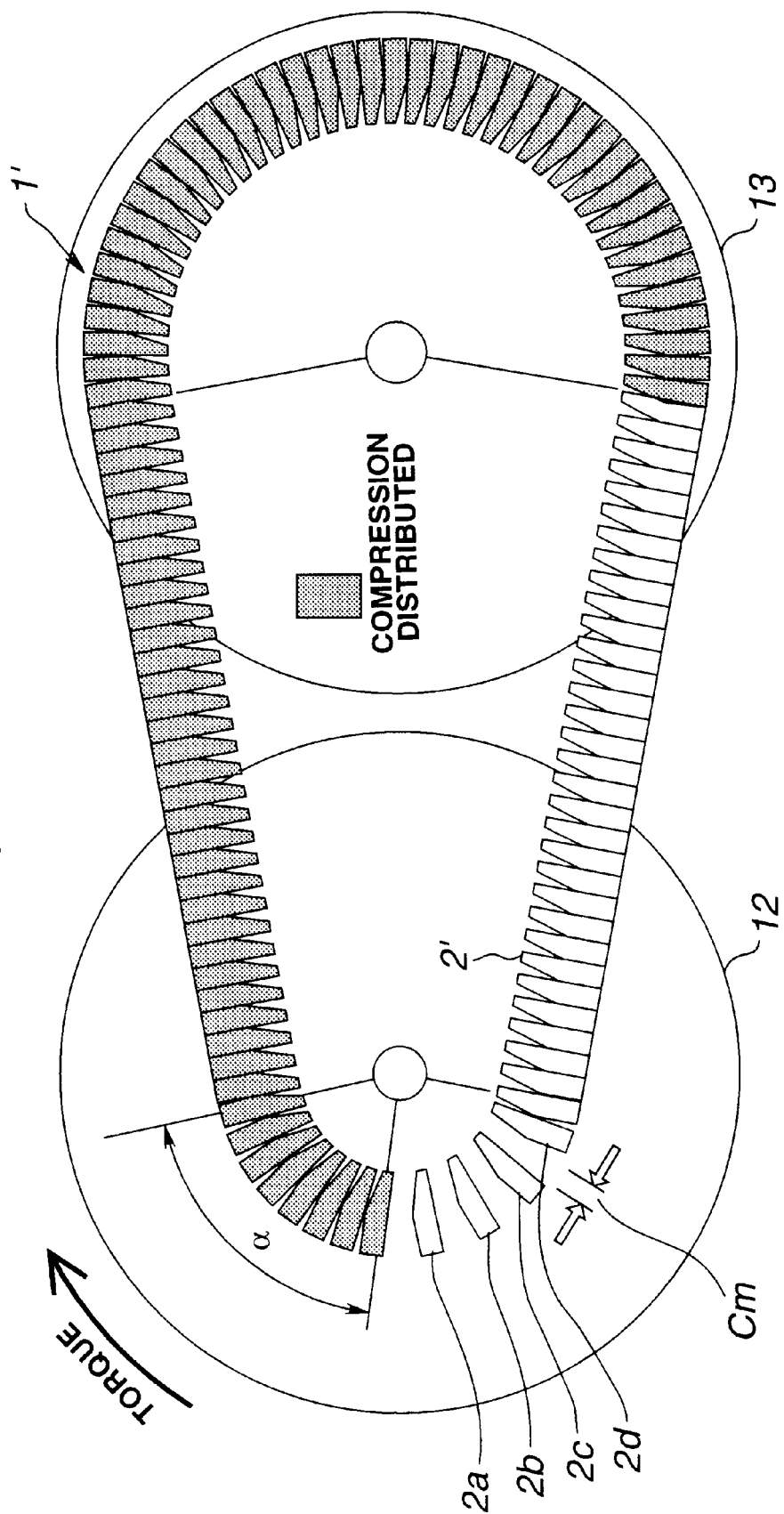
FIG. 12 is a schematic illustration showing the relationship between the conventional belt of FIG. 11 and pulleys in the continuously variable transmission.

The belt 1' is passed on a power input or drive pulley 12 and a power output or driven pulley 13 as shown in FIG. 12. Each pulley 12, 13 includes axially movable and fixed wheel counterparts (not shown) which are coaxially disposed and peripherally rotatable. The fixed wheel counterpart of the drive pulley 12 is connected through a power input shaft (not shown) to an engine, while the fixed wheel counterpart of the drive pulley 13 is connected through a power output shaft to an axle shaft of a road wheel of the vehicle. The movable and fixed wheel counterparts of each pulley have generally frustoconical surfaces which are coaxial and face each other to define a pulley groove (not shown) therebetween. The pulley groove is so shaped as to increase in width or axial dimension in the radially outward direction, and therefore generally V-shaped in section. The movable wheel counterpart is axially movable relative to the fixed wheel counterpart under an axial thrust which is determined in accordance with an operating condition of a vehicle provided with the continuously variable transmission, so that the width of the pulley groove is variable. Each element 2' has inclined side edge faces 5, 5 which are opposite to each other and in frictional contact respectively with the facing frustoconical surfaces of the movable and fixed wheel counterparts of each pulley. In this regards, a passed-on radius (r in FIG. 15B) of the belt 1' on the pulley is continuously variable by changing the width of the pulley groove. It will be understood that a transmission ratio or speed ratio of the continuously variable transmission is represented by the passed-on radius r of the belt 1' on the driven pulley 13 divided by the passed-on radius r of the belt 1' on the drive pulley 12.

In such a belt 1' for the continuously variable transmission, a slight initial clearance Cs exists between the adjacent elements 2', 2', in which the clearance Cs is smaller in peripheral direction of the belt 1' than the thickness of each element 2'.

Figure 13:
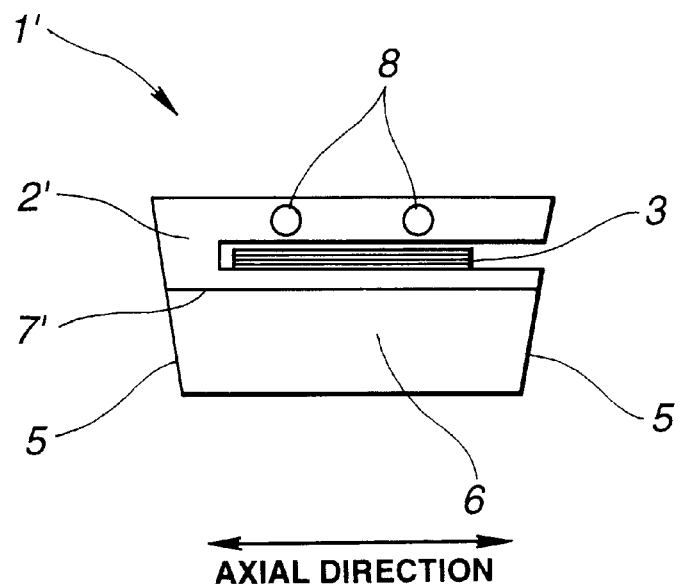
FIG. 13 is a sectional view similar to FIG. 1 but showing the front view of an element of the conventional belt of FIG. 11.
Figure 14:
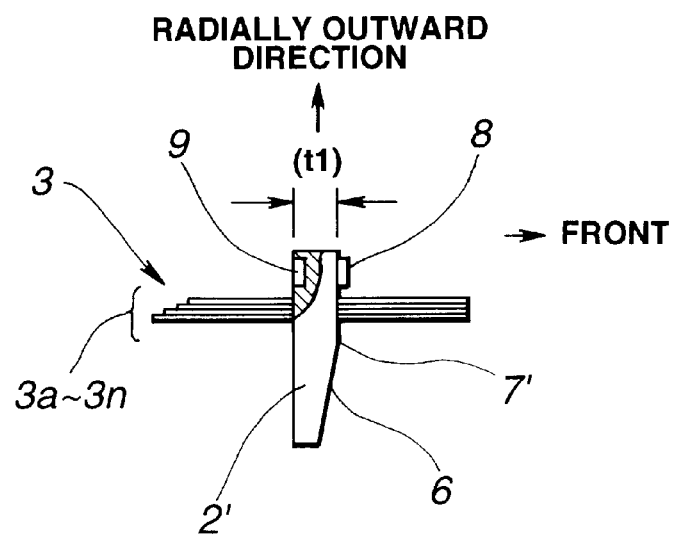
FIG. 14 is a fragmentary side view similar to FIG. 2 but showing the side view, partly in section, of the element of FIG. 13.
Figure 15A:
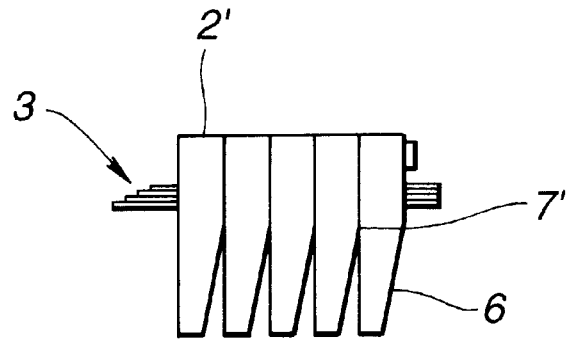
FIG. 15A is a fragmentary side view of the conventional belt of FIG. 11, at a section in a straight state.
Figure 15B:
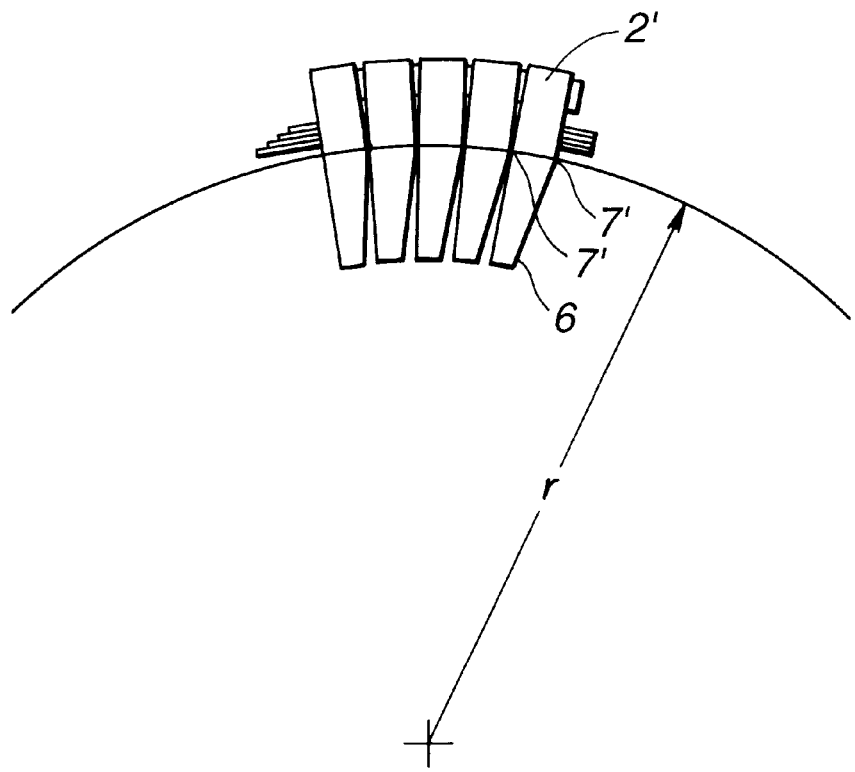
FIG. 15B is a fragmentary side view of the conventional belt of FIG. 11, at a section in a bent state.
Figure 16:
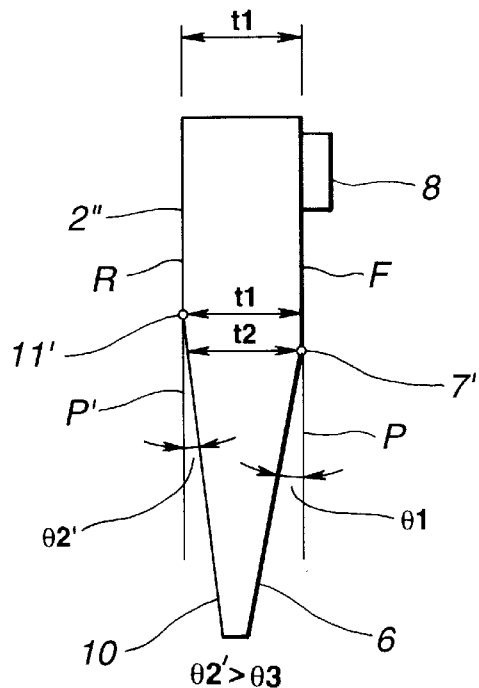
FIG. 16 is an enlarged side view similar to FIG. 3 but showing an element of another conventional belt for a continuously variable transmission.
Figure 17:
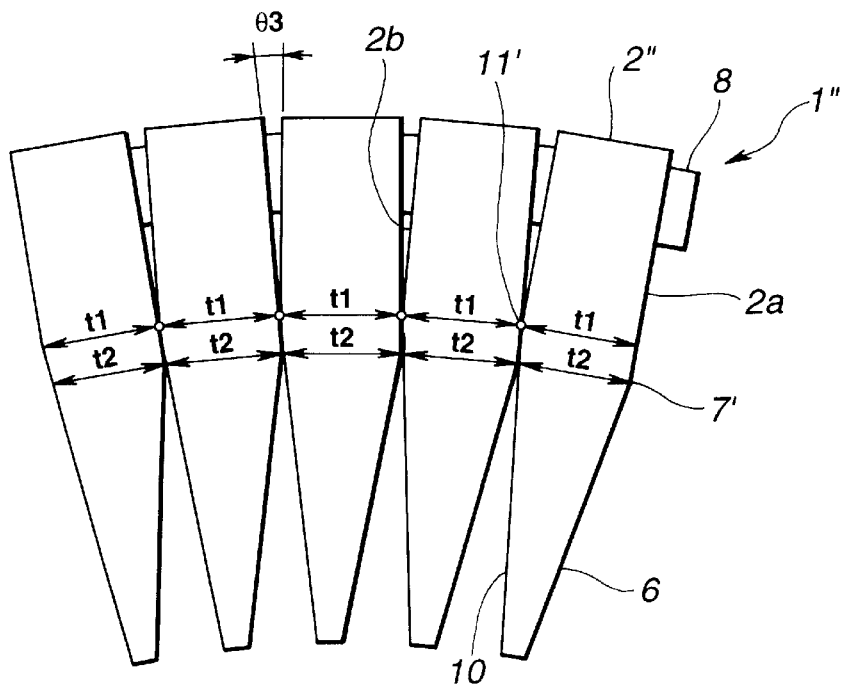
FIG. 17 is a fragmentary side view of the conventional belt of FIG. 16.
Figure 18A:
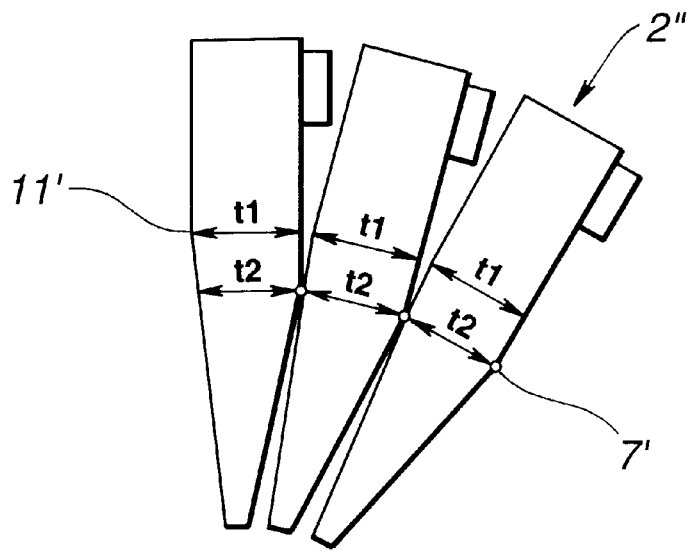
FIG. 18A is a fragmentary side view of the conventional belt of FIG. 16 on a dive pulley at a first transmission ratio.
Figure 18B:
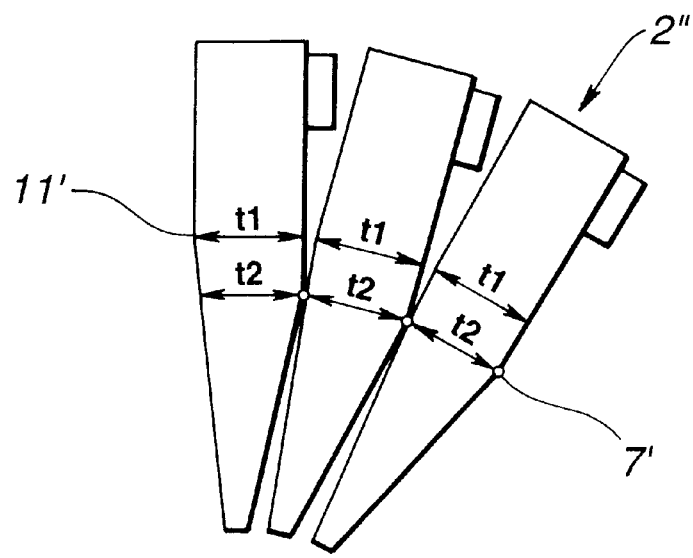
FIG. 18B is a fragmentary side view similar to FIG. 18A but showing the conventional belt of FIG. 16 on a driven pulley at the first transmission ratio.
Figure 19A:
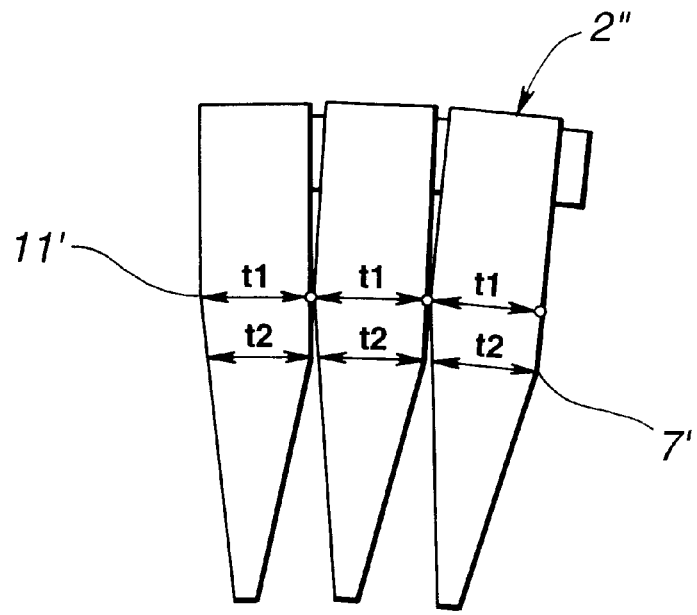
FIG. 19A a fragmentary side view of the conventional belt of FIG. 16 on the drive pulley at a second transmission ratio.
Figure 19B:
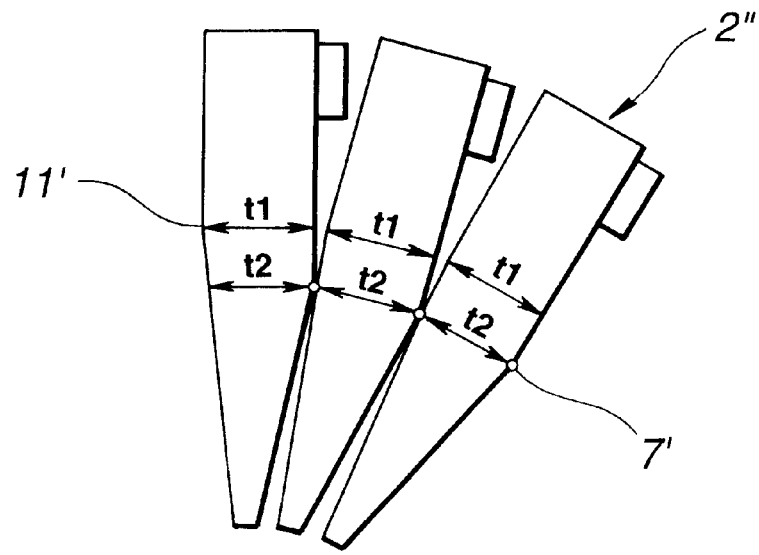
FIG. 19B is a fragmentary side view similar to FIG. 19A but showing the conventional belt of FIG. 16 on the driven pulley at the second transmission ratio.
Figure 20A:
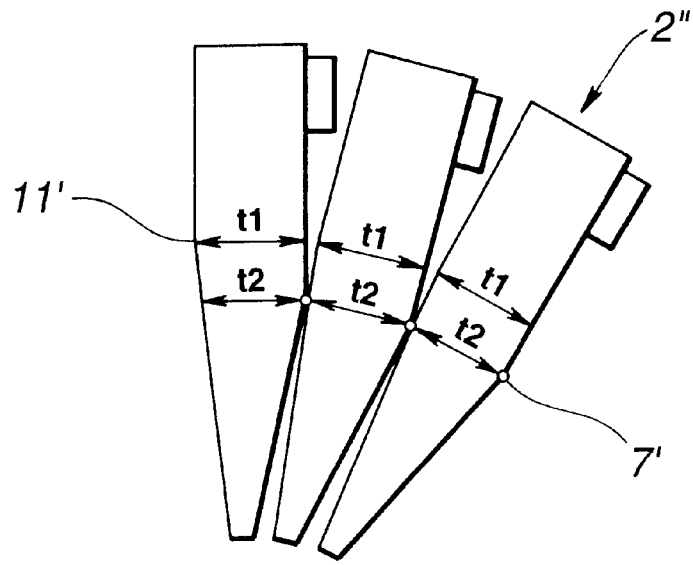
FIG. 20A is a fragmentary side view of the conventional belt of FIG. 16 on the drive pulley at a third transmission ratio.
Figure 20B:
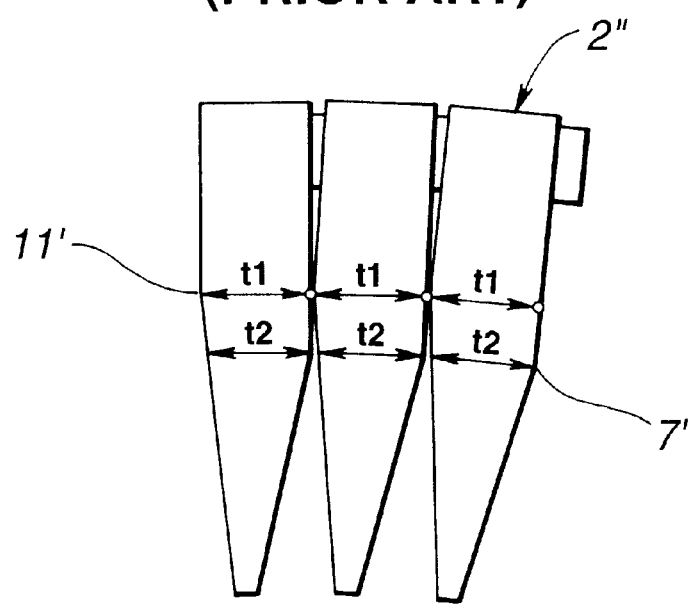
FIG. 20B is a fragmentary side view similar to FIG. 19A but showing the conventional belt of FIG. 16 on the driven pulley at the third transmission ratio.

As shown in FIGS. 13 to 15, each element 2' of the belt 1' has opposite inclined side edge faces 5, 5 which are brought into frictional contact respectively with the frustoconical surfaces of the axially movable and fixed wheel counterparts of each pulley 12, 13. Each inclined side edge face 5 is inclined relative to a plane perpendicular to the axis of the pulley in such a manner that an angle of inclination increases in a radially inward direction. The element 2' has a locking edge 7' at its front surface which faces a front side in the direction of rotation or running of the belt 1'. The front surface of the element 2' includes a front inclined face 6 which is located radially inward of the locking edge 7'. The front inclined face 6 is inclined relative to a plane P perpendicular to the ring 3, in such a manner that the width (in the peripheral direction of the belt) t1 of the element decreases in a radially inward direction. The adjacent elements 2', 2' are contactable with each other at their locking edges 7', 7' when the belt 1' is passed on the pulley upon being bent as shown in FIG. 15B, with the passed-on radius (or the radius of rotation) r of the belt 1'. Thus, the adjacent elements 2', 2' are inclined relative to each other thereby making it possible to allow the belt 1' to be passed on the pulley.

Each element 2' is provided at the radially outward part of the front surface relative to the locking edge 7', with two cylindrical projections 8, 8 which are to be fittable into two holes 9, 9 formed at the rear surface (opposite to the front surface) of the adjacent element 2' in front of the element 2'. The two cylindrical projections 8, 8 are separated from each other by a predetermined distance in the axial direction of the pulley. These projections 8, 8 and the corresponding holes 9, 9 prevent each element 2' from displacing in the axial direction of the pulley, so that many elements 2' can run upon being aligned in the peripheral direction of the pulley even when they run along a straight line between the drive and driven pulleys 12, 13.

Another conventional belt 1" for a continuously variable transmission is shown in FIGS. 16 to 20, which is similar to the above conventional belt 1' with the exception that a locking edge 11' and an inclined face 10 are formed at the rear surface of each element 2" in addition to the locking edge 7' and the inclined face 6 at the front surface of the element 2". Accordingly, the same reference numerals as those in FIGS. 11 to 15B designate the same elements and parts in FIGS. 16 to 20B. This conventional belt 1" is arranged such that the clearance between the adjacent elements 2', 2' is variable in accordance with the transmission ratio of the transmission. Such a conventional belt 1" is disclosed, for example, in Japanese Patent Provisional Publication No. 6-129494.

The belt 1" includes the laminated ring 3 (not shown) which is formed by laminating the plural endless or circular steel sheets 3a to 3n similarly to that in the above conventional belt 1'. The generally wedge-shaped elements 2" are supported on the laminated ring 3 and aligned along the longitudinal or peripheral direction of the laminated ring 3.

Each element 2" of the belt 1" has the opposite inclined side edge faces 5, 5 which are brought into frictional contact respectively with the frustoconical surfaces of the axially movable and fixed wheel counterparts of each pulley 12, 13 similarly to that of the above conventional belt 1', though not shown. The element 2" has the locking edge 7' at its front surface, and another locking edge 11' at its rear surface which is opposite to the front surface and faces a rear side in the rotational or running direction of the belt 1". The front surface of the element 2" includes the front inclined face 6 which is located radially inward of the locking edge 7'. The front inclined face 6 is inclined by an inclination angle θ1 relative to a plane P containing a front radially outward face F which is generally perpendicular to the ring 3, in such a manner that the width (in the peripheral direction of the belt) t1 of the element decreases in the radially inward direction. The front radially outward face F is located radially outward of the locking edge 7'.

The rear surface of the element 2" includes a rear inclined face 10 which is located radially inward of the locking edge 11'. The rear inclined face 10 is inclined by an inclination angle θ2' relative to a plane P' containing a rear radially outward face R which is generally perpendicular to the ring 3, in such a manner that the width (in the peripheral direction of the belt) t1 of the element decreases in the radially inward direction. The rear radially outward face R is located radially outward of the locking edge 11'. It will be understood that the thickness t1 of each element 2" corresponds to the distance between the front and rear radially outward faces F, R.

The adjacent elements 2", 2" are contactable with each other at their locking edges 7', 7', 11', 11' when the belt 1" is passed on the pulley upon being bent (as shown in FIG. 15B), with the passed-on radius (or the radius of rotation) r of the belt 1". Thus, the adjacent elements 2", 2" are inclinable relative to each other thereby making it possible to allow the belt 1" to be passed on the pulley.

The inclination angle θ1 is set larger than a relative inclination angle θ3 (in FIG. 17) of the adjacent elements 2", 2" which relative inclination angle is obtained when the belt 1" is passed on the pulley at the smallest passed-on radius r throughout the whole transmission ratio range. The relative inclination angle θ3 is to be formed between the front and rear radially outward faces F, R of the adjacent elements 2", 2". Additionally, the angle θ2' is set smaller than the relative inclination angle θ3 obtained when the belt 1" is passed at the transmission ratio of 1.

The locking edge 11' at the rear surface of the element 2" is located radially outward of the locking edge 7' at the front surface of the element 2", in which the thickness t1 at the radial level of the locking edge 11' is larger than the thickness t2 at the radial level of the locking edge 7' (t1>t2).

Here, discussion will be made on the assumption that a transmission ratio range realizable by the belt 1" is from 0.4 to 2.4; and the inclination angle θ2' of the inclined face 6 of each element 2" is set to be equal to the relative inclination angle θ 3 which is obtained when the belt 1" is passed on the driven pulley at the transmission ratio of 1.5.

(1) Under a condition of 1/1.5<transmission ratio<1.5, the following relationships are established:

a) the inclination angle θ2'<the relative inclination angle θ3 of the belt on the drive pulley 12<the inclination angle θ1; and b) the inclination angle θ2'<the relative inclination angle θ3 of the belt on the driven pulley 13<the inclination angle θ1.

As a result, all the elements 2" of a part of the belt passed or wound on the drive and driven pulleys 12, 13 are in contact with each other at their locking edges 7' so that the belt 1" runs or rotates with the effective thickness t2 of each element 2" (or a pitch between the adjacent working locking edges 7', 7'). Passed-on states of the belt 1" on the drive and driven pulleys 12, 13 at this time are shown respectively in FIGS. 18A and 18B. It will be understood that the effective thickness of each element 2" (or the pitch between the adjacent working locking edges 11', 11') is t1 (t1>t2) at the straight part of the belt 1" located between and not passed on the drive and driven pulleys 12, 13 as illustrated in FIG. 12.

(2) Under a condition of 0.4<transmission ratio<1/1.5, the following relationships are established:

a) the relative inclination angle θ3 of the belt on the drive pulley 12<the inclination angle θ2'<the inclination angle θ1; and b) the inclination angle θ2'<the relative inclination angle θ3 of the belt on the driven pulley 13<the inclination angle θ1.

As a result, all the elements 2" of a part of the belt 1" passed or wound on the drive pulley 12 are in contact with each other at their locking edges 11' so that the belt 1" runs or rotates with the thickness t1 of each element 2" (or the pitch between the adjacent working locking edges 7', 7'). All the elements 2" of a part of the belt 1" passed or wound on the driven pulley 13 are in contact with each other at their locking edges 7' so that the belt 1" runs or rotates with the effective thickness t2 (or the pitch between the adjacent working locking edges 7', 7'). Passed-on states of the belt 1" on the drive and driven pulleys 12, 13 at this time are shown respectively in FIGS. 19A and 19B. It will be understood that the effective thickness of each element 2" (or the pitch between the adjacent working locking edges 11', 11') is t1 (t1>t2) at the straight part of the belt 1" located between and not passed on the drive and driven pulleys 12, 13.

(3) Under a condition of 1.5<transmission ratio<2.4, the following relationships are established:

a) the inclination angle θ2'<the relative inclination angle θ3 of the belt on the drive pulley 12<the inclination angle θ1; and b) the relative inclination angle θ3 of the belt on the driven pulley 13<the inclination angle θ2'<the inclination angle θ1.

As a result, all the elements 2" of the part of the belt 1" passed or wound on the drive pulley 12 are in contact with each other at their locking edges 7' so that the belt 1" runs or rotates with the effective thickness t2 of each element 2"

(or pitch between the adjacent contacting locking edges 7', 7'). All the elements 2" of the part of the belt 1" passed or wound on the driven pulley 13 are in contact with each other at their locking edges 11' so that the belt 1" runs or rotates with the effective thickness t1 (or the pitch between the adjacent working locking edges 11', 11'). Passed-on states of the belt 1" on the drive and driven pulleys 12, 13 at this time are shown respectively in FIGS. 20A and 20B. It will be understood that the effective thickness of each element 2" (or the pitch between the adjacent working locking edges 11', 11') is t1 (t1>t2) at the straight part of the belt 1" located between and not passed on the drive and driven pulleys 12, 13.

As seen from the above, within the transmission ratio range of the above (1), the rate of the elements whose effective thickness (or the pitch between the adjacent working locking edges) is small increases as compared with that within the transmission ratio ranges of the above (2) and (3), so that the circumference of the belt is shortened while the amount of clearances produced among the elements 2", 2" increases. Therefore, the clearance produced among the elements increases or decreases in accordance with the transmission ratio of the belt of the transmission.

Figure 11:
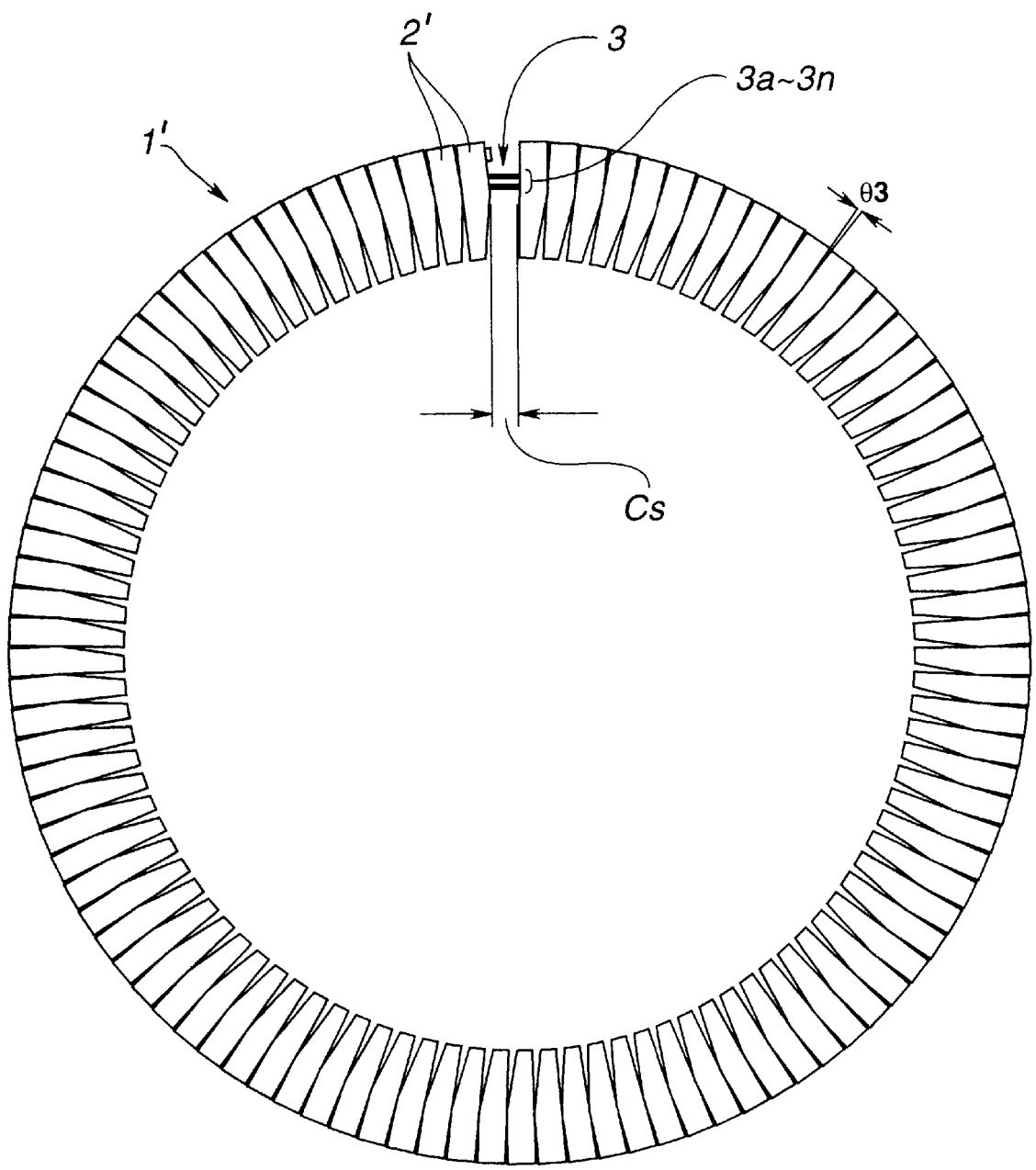
FIG. 11 is a side view of a conventional belt for a continuously variable transmission, in an assembled state.

However, drawbacks have been encountered in the above discussed conventional belts for the continuously variable transmission. That is, in the conventional belts 1', 1", the initial clearance Cs shown in FIG. 11 is produced when the belt is assembled. Additionally, a tension is applied to the belt when the transmission is operated upon the belt being passed on the drive and driven pulleys 12, 13, and therefore the tension is applied also to the laminated ring 3 so that the laminated ring 3 is extended. As a result, a slip has been unavoidably generated between the belt 1', 1" and the drive and driven pulleys 12, 13.

In the former conventional belt 1' for the continuously variable transmission as disclosed in Japanese Patent Provisional Publication No. 55-100443, only one locking edge 7' is formed at the front surface of each element 2', and therefore the effective thickness of each element 2' (or the pitch between the adjacent working locking edges) is equal to the actual thickness t1 of each element 2' regardless of the fact that the belt 1' is in a straight state or in a curved state. In other words, if the transmission ratio (or the passed-on radius r) of the belt 1' changes, the circumference (=the number of the elements×the effective thickness of each element) of the circularly arranged elements constituting the belt 1' does not change. As a result, the amount of the clearance produced between the adjacent elements 2', 2' of the belt 1' does not increase or decrease in accordance with a change in the transmission ratio.

Additionally, since the above former conventional belt 1' is generally in a state of complete round during assembly of the belt 1' as shown in FIG. 11, the following relationship is established: The relative inclination angle θ3 between the adjacent elements of the belt in the complete round state<the inclination angle θ2'<the inclination angle θ1. Accordingly, all the elements 2' are in contact with each other at their locking edge 11' so that the effective thickness of all the elements is t1, during assembly of the belt 1'. In other words, the circumference of the circularly arranged elements constituting the belt during the assembly of the belt is the largest of those during operation of the transmission at any transmission ratio, and therefore the clearance produced between the adjacent elements 2', 2' during the operation of the transmission is necessarily larger than that produced between the adjacent elements 2', 2' during the assembly of the belt 1'.

As discussed above, in the conventional belt 1' as disclosed in Japanese Patent Provisional Publication No. 55-100443, slip is generated between the belt 1' and the pulley owing to the initial clearance Cs produced during the assembly of the belt and the clearances produced between the elements upon extension of the laminated ring 3 during operation of the transmission. This lowers a power transmission efficiency of the transmission and durability of the belt.

Even on the assumption that the belt 1' can be assembled with no initial clearance Cs, it is impossible to make zero the amount of extension of the laminated ring 3 due to tension applied during operation of the transmission. Thus, it is impossible to reduce the slip caused between the belt 1' and the pulley under the action of the clearances between the elements 2', 2', in the conventional belt.

In the latter conventional belt 1" for the continuously variable transmission as disclosed in Japanese Patent Provisional Publication No. 6-129494, the circumference of the circularly arranged elements constituting the belt 1" during assembly of the belt is the largest of those obtained during operation of the belt at any transmission ratios. Accordingly, the clearance produced between the elements 2", 2" during the operation of the transmission is necessarily larger than the initial clearance Cs produced during the assembly of the belt 1". In this case, it is impossible to reduce the slip of the belt 1" relative to the pulley owing to the clearance between the elements 2', 2'. This also lowers the power transmission efficiency of the transmission and the durability of the belt 1".

In view of the above description of the belts for the continuously variable transmissions, reference is now made to FIGS. 1 to 10, more specifically to FIGS. 1 to 4, wherein a first embodiment of a belt for a continuously variable transmission (CVT), of the present invention is illustrated by the reference numeral 1. It is to be noted that the belt 1 of this embodiment is similar in structure to the conventional belts 1', 1" except for the construction of each element 2, and therefore has a structure similar to that shown in FIGS. 11 to 15B. In other words, the structure as shown in FIGS. 11 to 15B is generally common to both the above-discussed conventional belts 1' , 1" and to the belt 1 of this embodiment. Accordingly, explanation of the belt 1 of this embodiment will be made with reference to FIGS. 11 to 15B, so that the same (or like) reference numerals as in the conventional belts are assigned to the same parts and elements in the belt 1 of this embodiment for the purpose of simplicity of illustration.

In this embodiment, the belt 1 is passed on the power input or drive pulley 12 and the power output or driven pulley 13 similarly to that shown in FIG. 12. Each pulley 12, 13 includes axially movable and fixed wheel counterparts W1, W2 which are coaxially disposed and peripherally rotatable. The fixed wheel counterpart W2 of the drive pulley 12 is connected through the power input shaft (not shown) to the engine, while the fixed wheel counterpart W2 of the drive pulley 13 is connected through the power output shaft to the axle shaft of the road wheel of the vehicle. The movable and fixed wheel counterparts W1, W2 of each pulley have generally frustoconical surfaces F1, F2 which are coaxial and face each other to define the pulley groove therebetween. The pulley groove is so shaped as to increase in width or axial dimension in the radially outward direction, and therefore generally V-shaped in section. The movable wheel counterpart W1 is axially movable relative to the fixed wheel counterpart under an axial thrust which is determined in accordance with an operating condition of the vehicle provided with the continuously variable transmission, so that the width of the pulley groove is variable. Each element 2 has the opposite inclined side edge faces 5, 5 which are opposite to each other and in frictional contact respectively with the facing frustoconical surfaces of the movable and fixed wheel counterparts of each pulley. In this regards, the passed-on radius (corresponding to r in FIG. 15B) of the belt 1 on the pulley is continuously variable by changing the width of the pulley groove, thereby continuously varying the transmission ratio of the transmission to accomplish power transmission. It will be understood that the transmission ratio or speed ratio of the continuously variable transmission is represented by the passed-on radius (r) of the belt 1 on the driven pulley 13 divided by the passed-on radius (r) of the belt 1 on the drive pulley 12. The transmission ratio is represented also by the revolution speed of the drive pulley 12 divided by the revolution speed of the driven pulley 13.

As shown in FIGS. 1 to 4, the belt 1 includes the laminated ring 3 which is formed by laminating the plural endless or circular steel sheets $3a$ to $3n$ similarly to that in the above conventional belt 1', 1". A plurality of generally wedge-shaped steel elements 2 are supported on the laminated ring 3 and aligned along the longitudinal or peripheral direction of the laminated ring 3 so that the adjacent ones are contactable with each other. Each element 2 of the belt 1 has the opposite inclined side edge faces 5, 5 which are brought into frictional contact respectively with the frustoconical surfaces of the axially movable and fixed wheel counterparts of each pulley 12, 13 similarly to that of the above conventional belt 1', 1", though not shown. The element 2 has a locking edge 7 at its front surface $2a$ which faces front (forward) of the element in the rotational or running direction of the belt 1, and another locking edge 11 at its rear surface $2b$ which is opposite to the front surface and faces rear (rearward) of the element. Each locking edge 7, 11 straightly extends axially relative to the pulley in a manner to connect the opposite inclined side edge faces 5, 5. The front surface $2a$ of the element 2 includes the front inclined face 6 which is located radially inward of the locking edge 7. The front inclined face 6 is inclined by an inclination angle $\theta 1$ relative to the plane P containing a front radially outward face F which is generally perpendicular to the ring 3, in such a manner that the width t1 (in the peripheral direction of the belt) of the element decreases in the radially inward direction. The front radially outward face F is located radially outward of the locking edge 7.

The rear surface $2b$ of the element 2 includes the rear inclined face 10 which is located radially inward of the locking edge 11. The rear inclined face 10 is inclined by an inclination angle $\theta 2$ relative to the plane P' containing the rear radially outward face R which is generally perpendicular to the ring 3, in such a manner the width t1 (in the peripheral direction of the belt) of the element decreases in the radially inward direction. The rear radially outward face R is located radially outward of the locking edge 11, and parallel with the front radially outward face F in the front surface $2a$. It will be understood that the thickness t1 of each element 2 corresponds to the distance between the front and rear radially outward faces F, R.

Figure 4:
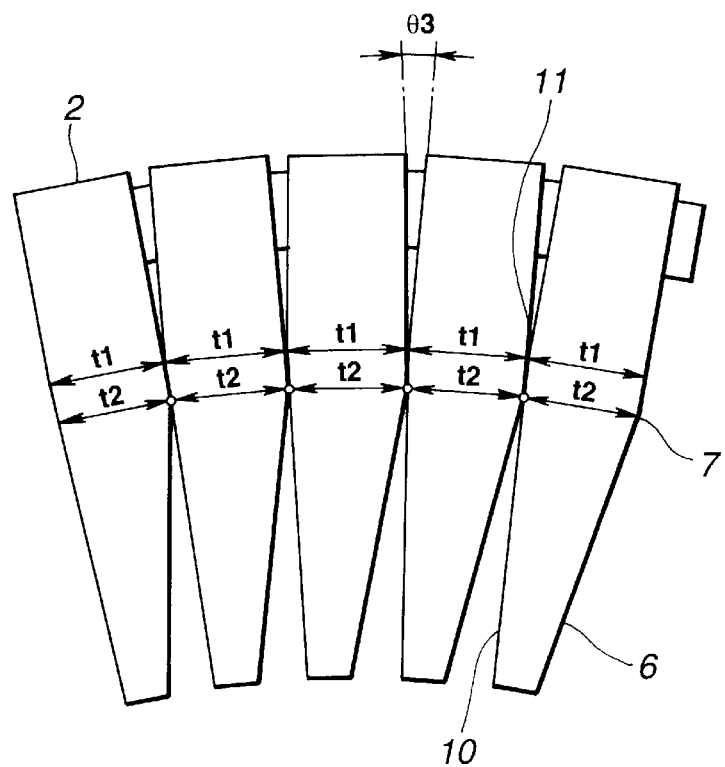
FIG. 4 is an enlarged fragmentary side view of the belt of FIG. 1 in an assembled state.

The adjacent elements 2, 2 are contactable with each other at their locking edges 7, 7, 11, 11 when the belt 1 is passed or partly wound on the pulley upon being bent as shown in FIG. 4, with the passed-on radius (or the radius of rotation) r of the belt 1. Thus, the adjacent elements 2, 2 are inclinable relative to each other thereby making it possible to allow the belt 1 to be passed on the pulley.

The inclination angle $\theta 1$ is set larger than the relative inclination angle $\theta 3$ (in FIG. 4) of the adjacent elements 2, 2 which relative inclination angle is obtained when the belt 1 is passed or partly wound on the pulley at the smallest passed-on radius r in all passed-on radiuses obtained throughout the whole transmission ratio range. The relative inclination angle $\theta 3$ is to be formed between the facing front and rear radially outward faces F, R of the adjacent elements 2, 2. The front inclined face 6 is inclined toward the rear side relative to the plane P (or the extension of the front radially outward face F).

It is to be noted that the inclination angle $\theta 2$ of the rear inclined face 10 relative to the plane P' is set smaller than the relative inclination angle $\theta 3$ formed between the faces F, R of the adjacent elements 2, 2 when the belt 1 is generally in the state of complete round as shown in FIG. 11. The rear inclined face 10 is inclined toward the front side relative to the plane P' (or the extension of the rear radially outward face R). It will be understood that each element 1 may be used in place of the conventional elements 1', 1" as shown in FIGS. 11 to 20B to constitute an essential part (as shown in FIG. 12) of the continuously variable transmission.

The locking edge 11 at the rear surface of the element 2 is located radially outward of the locking edge 7 at the front surface of the element 2, in which the thickness t1 at the radial level of the locking edge 11 is larger than the thickness t2 (of the element 2) at the radial level of the locking edge 7 (t1>t2).

Next, in order to facilitate explanation of operation of the belt 1 of the present invention, the principle of generating slip of the belt 1 relative to the pulley owing to the clearance between the adjacent elements 2, 2 will be discussed in connection with the continuously variable transmission including the belt 1.

Figure 1:
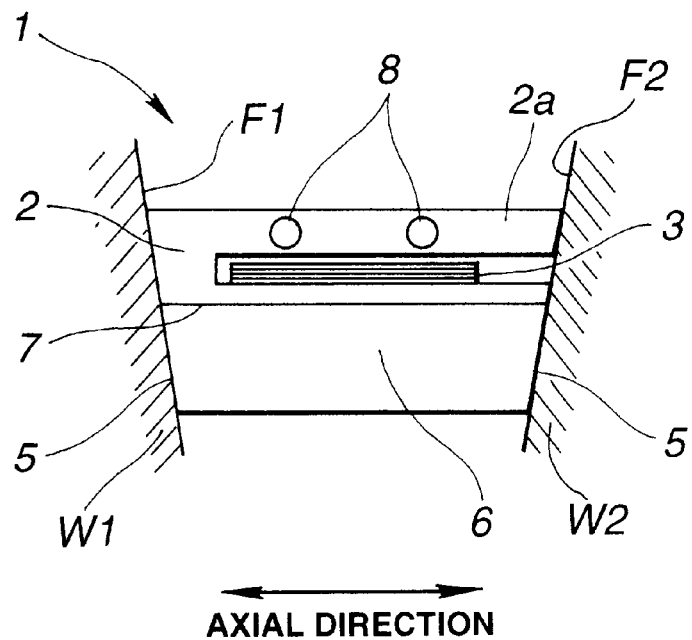
FIG. 1 is a sectional view of an embodiment of a belt for a continuously variable transmission, according to the present invention, clearly showing the front view of each element of the belt.
Figure 2:
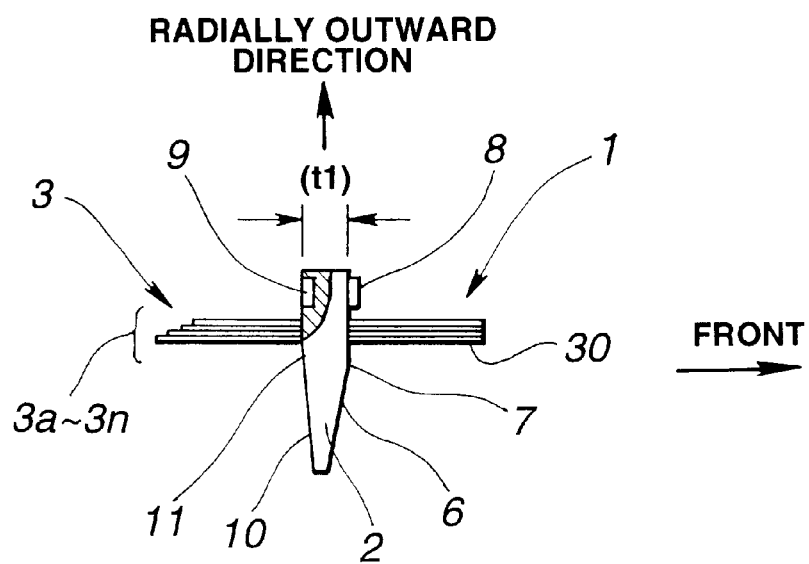
FIG. 2 is a fragmentary side view of a part of the belt of FIG. 1, showing the side view, partly in section, of the element.
Figure 3:
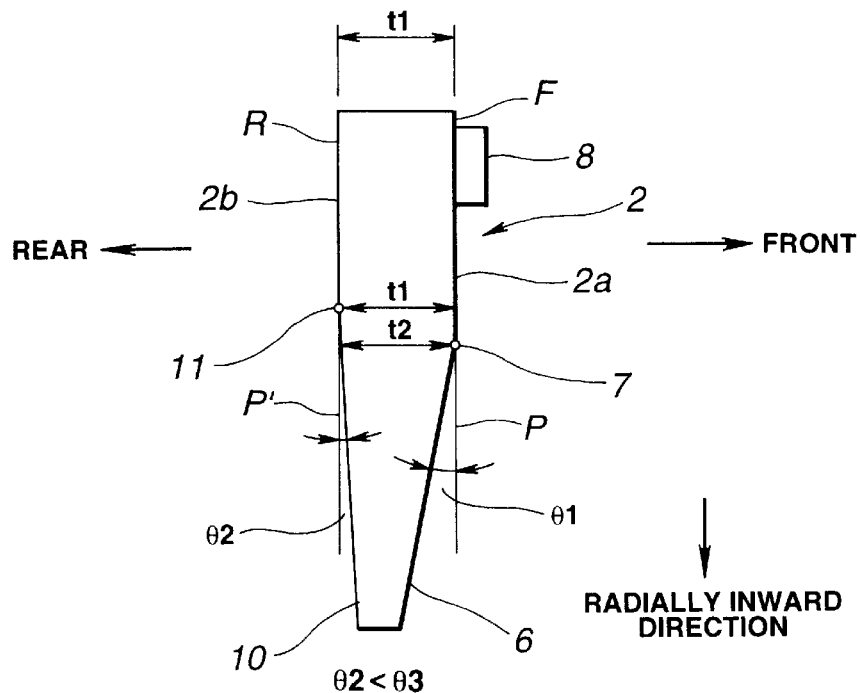
FIG. 3 is an enlarged side view of the element of the belt of FIG. 1.

Assume that, in FIG. 2, the circumference of the inner peripheral surface of the inner-most annular sheet $3n$ of the laminated ring 3 is 700 mm, and the radial distance between the inner peripheral surface of the inner-most annular sheet $3n$ and the locking edge 7 is 1.0 mm; and in FIG. 3, the thickness (t1) of each element 2 is 2.0 mm, and the thickness (t2) of each element 2 is 1.99 mm. In this case, the total number of the elements 2 which can be assembled in the belt 1 is given by the following equation since the effective thickness (or the pitch between the adjacent working locking edges) of each element 2 is t2 during assembly of the belt 1:

(700−2×1×π(ratio of the circumference of a circle to its diameter))÷1.99=348.601, in which the number of the elements 2 must be an integer and therefore the total number is 348.

When the elements 2 of this total number are assembled into the belt 1, the initial clearance Cs given by the following equation is produced between the adjacent elements 2, 2 as shown in FIG. 11:

(700−2×1×π)−348×1.99=1.20 mm

Now, the amount of this initial clearance Cs is smaller than the thickness t2 of the element 2, and therefore it is impossible to reduce this initial clearance Cs if a particular element 2 having a smaller thickness is not particularly produced to fill the initial clearance Cs. Even if such a particular element 2 having a smaller thickness is actually produced, it is impossible to assemble the belt 1 with no initial clearance Cs because a clearance corresponding to the axial length of the projections 8 of the element 2 is required when the last element 2 is assembled to the laminated ring 3.

Subsequently, the feature of power transmission by the belt of this type in the continuously variable transmission will be discussed. A tensile belt such as a rubber belt or a chain transmits power under tension (tensile force), whereas the belt 1 of this type transmits power mainly under compression (compressive force) applied to each element 2.

However, since the initial clearance Cs exists in the belt 1, there occurs a condition in which compression does not act between the adjacent elements 2, 2 so as to establish a clearance and compression distribution state of the elements 2 as shown in FIG. 12. In FIG. 12, the belt 1 is passed on the drive and driven pulleys 12, 13 to transmit a certain torque from the drive pulley 12 to the driven pulley 13, in which compression acts on a shaded or compression acting range of the belt 1 while no compression acts on a clear or not compression acting range of the belt 1.

Here, the clearances each of which is located between the elements 2, 2 are uniformly distributed on a part of the belt 1 on the drive pulley 12 within the no compression acting range, in which the elements 2a to 2d in a separated state rotate with the drive pulley as a single member.

Now, on the assumption that the effective thickness of the elements is t, and the average clearance between the adjacent elements 2, 2 is Cm, when the drive pulley 12 turns by a distance of t+Cm from the state of FIG. 12, the elements 2a to 2d turn or rotate by the same distance of t+Cm so that the average clearance Cm located in front of the element 2a is disappeared. Accordingly, all the elements 2 within the compression acting range is pushed forward by a distance of t. As a result, the elements 2 within the compression acting range slip relative to the drive pulley 12 by a distance of Cm÷(t+Cm).

The above-discussed phenomena is a basic mechanism of generating slip of the belt 1 relative to the pulley in the continuously variable transmission of this type. On the assumption that an angle of a region in which compression acts on the elements 2 is α as shown in FIG. 12, the angle α is generally proportional to a transmitted torque which is transmitted from the drive pulley to the driven pulley, and therefore the average clearance Cm increases generally proportionally to the transmitted torque. Accordingly, the amount of the slip generated owing to the clearance between the adjacent elements 2, 2 increases generally proportionally to the transmitted torque.

As discussed above, in the belt 1 of the continuously variable transmission of this type, slip of the belt 1 relative to the pulley is generated owing to existence of clearance between the adjacent elements 2, 2, and acts as a cause for lowering an allowable transmitted torque and a power transmission efficiency of the belt 1.

Next, the manner of operation of the belt 1 of this embodiment as shown in FIGS. 1 to 4 will be discussed.

When the belt 1 including elements 2 each having the front and rear inclined faces 6, 10 of the predetermined inclination angles θ1, θ2 is assembled, the initial clearance Cs of about 1.2 mm is produced between the adjacent elements 2, 2 as discussed above. Additionally, it is assumed that the laminated ring 3 extends about 1 mm under tension applied to the belt 1 in case that the belt 1 is passed or partly wound on the input pulley 12 and the output pulley 13 to transmit a power as shown in FIG. 12. Accordingly, a total clearance of about 2.2 mm is produced between the elements 2, 2.

Here, during assembly of the belt 1 in the generally complete round state as shown in FIG. 11, the effective thickness of all the elements 2 is t2 (t2<t1). However, during operation of the belt 1 as shown in FIG. 12, the belt 1 includes its sections in a bent state upon being wound on the drive or drive pulley 12, 13, and its sections in a straight state upon lying between the drive and driven pulleys 12, 13. A plurality of the elements 2 are contained in each section of the belt 1 in the bend or straight state. A ratio between the number of the elements 2 in the bent state sections of the belt 1 and the number of the elements 2 in the straight state sections of the belt 1 are as follows on the assumption that the distance between the axes of the drive and driven pulleys 12, 13 is, for example, 160 mm, and a range of the transmission ratio obtainable by the belt 1 is from 0.4 (at the highest transmission ratio) to 2.4 (at the lowest transmission ratio):

(the number of the elements in the bent state sections the number of the elements in the straight state sections)= (152:196) to (160:188).

It will be understood that the effective thickness (or the pitch between the adjacent working locking edges) of each element 2 in the straight state sections of the belt 1 is t1 as seen from FIG. 12. Accordingly, the effective thickness of the elements 2 in the straight section increases from t2 (1.99 mm) to t1 (2.0 mm), and therefore an increased amount in circumference (at the radial level of the working locking edge) of the whole belt 1 due to the increase in the effective pitch is calculated as follows:

$$(t1-t2) \times [152 \text{ to } 160] = 0.01 \times [152 \text{ to } 160] = 1.52 \text{ to } 1.60 \text{ mnm}.$$

Thus, the clearance between the elements 2, 2 reduces by about 1.6 mm, in which such effects are slightly different in accordance with the transmission ratios.

In contrast, in the conventional belt 1' as disclosed in Japanese Patent Provisional Publication No. 55-100443, only one locking edge is formed to provide only one effective pitch of each element of the belt 1'. Accordingly, the circumference of the belt 1' (at the radial level of the locking edge) never changes between during assembly of the belt 1' as shown in FIG. 11 and that during operation of the belt 1' as shown in FIG. 12, so that the initial clearance Cs and the clearance corresponding to the extension amount of the laminated ring 3 always appear between the elements during the operation of the belt 1'.

Thus, even in case the clearance of about 2.2 mm is produced between the elements in the conventional belt 1', the belt 1 of this embodiment can reduce the clearance (to be produced between the elements 2) to about 0.6 mm (=2.2 mm−1.6 mm) which is referred to as a "clearance reduction amount".

Figure 5:
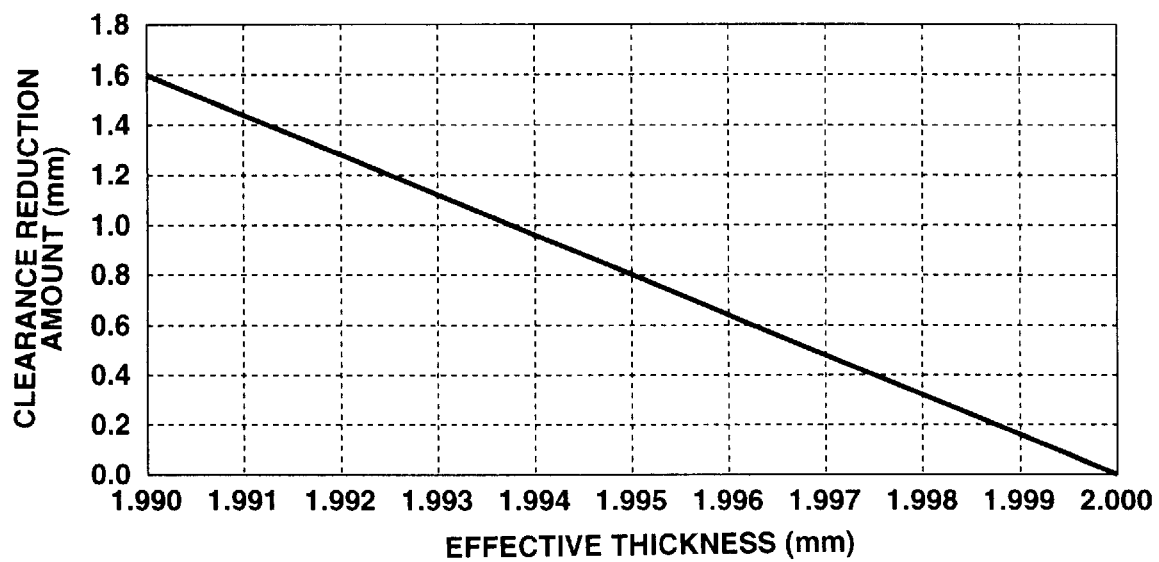
FIG. 5 is a graph showing the relationship between the effective thickness of the element and the clearance reduction amount in connection with the belt of FIG. 1.

The relationship between the clearance reduction amount and the effective thickness t2 of each element 2 is shown in FIG. 5. According to the graph of FIG. 5, the clearance reduction amount increases proportionally to reduction in the effective thickness (t2) of each element 2, and therefore it is possible to obtain a value of t2 (required to prevent a clearance from being produced between the elements 2) from this graph if the initial clearance of the belt 1 and the extension amount of the laminated ring 3 during operation of the belt 1 have been known.

As discussed above, according to this embodiment, each element 2 is formed also at its rear surface with the inclined face 10 so that its thickness gradually decreases toward its radially inward end. The inclined face 10 extends radially inwardly from the locking edge 11 which is located radially outward of the locking edge 7 at the front surface of the element 2. Additionally, the inclination angle θ2 of this inclined face 10 is set smaller than the relative inclination angle θ3 to be formed between the radially outward faces F, R of the adjacent elements 2, 2 when the belt 1 is in the state of complete round. As a result, the circumference (at the radial level of the effective thickness of elements 2) of the circularly arranged elements 2 increases proportionally to the number of the elements 2 which are aligned in the straight state, and therefore the clearance formed between the adjacent elements 2, 2 owing to the initial clearance Cs and extension of the laminated ring 3 can effectively reduced. This effectively suppresses slip of the belt relative to the pulley, thus improving the power transmission efficiency and the durability of the belt 1.

Figure 6:
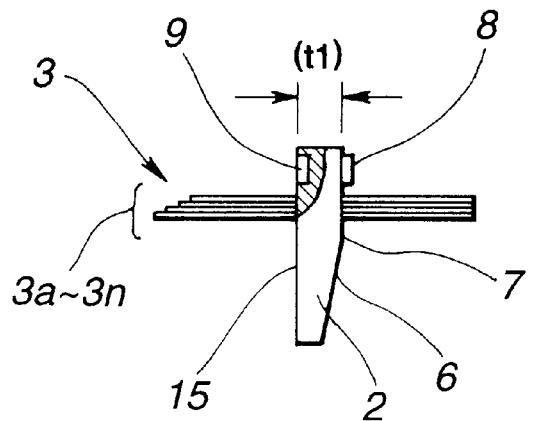
FIG. 6 is a fragmentary side view similar to FIG. 2 but showing a part of a second embodiment of the belt for the continuously variable transmission, according to the present invention.
Figure 7:
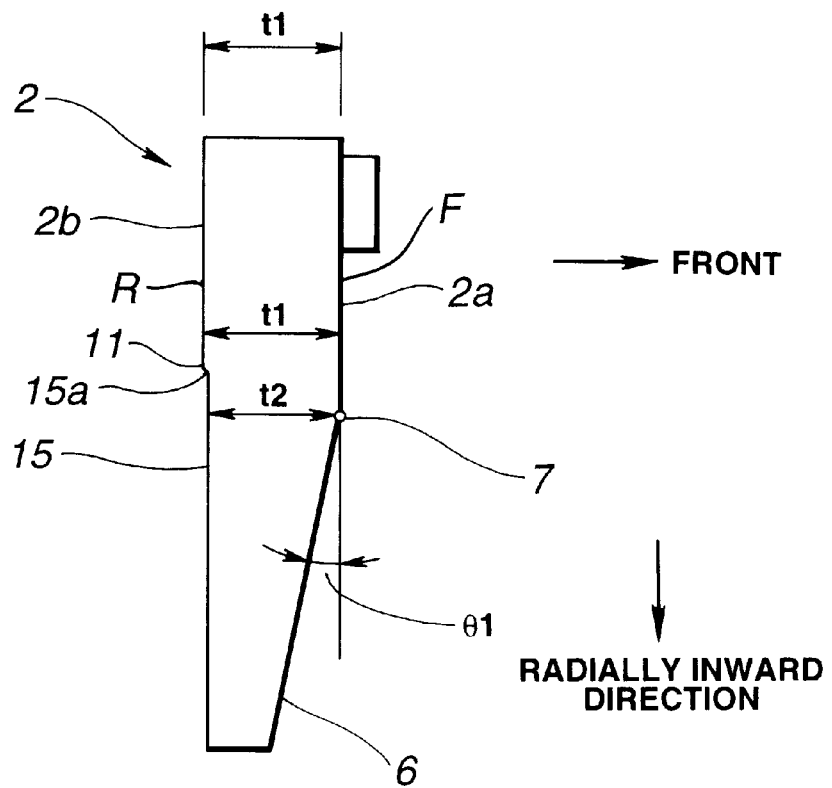
FIG. 7 is an enlarged side view of an element of the belt of FIG. 6.
Figure 8:
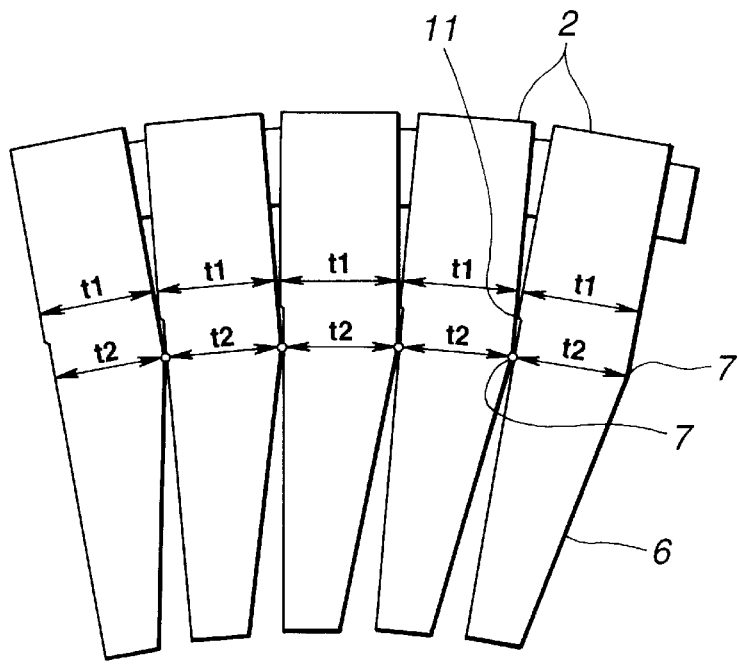
FIG. 8 is an enlarged fragmentary side view similar to FIG. 4 but showing the belt of FIG. 6 in an assembled state.

FIGS. 6 to 8 illustrate a second embodiment of the belt 1 according to the present invention, which is similar in construction to the first embodiment of FIGS. 1 to 4 with the exception that the rear inclined face 10 is replaced with a depressed face 15 formed at the rear surface 2b of each element 2.

More specifically, each element 2 is formed at its rear surface 2b with the depressed face 15 which is flat and parallel with the rear radially outward face R. The depressed face 15 is slightly depressed toward the front side relative to the rear radially outward face R. The rear radially outward face R and the depressed face 15 are connected with each other at the locking edge 11 thereby forming a step portion 15a. As shown in FIG. 7, the thickness of the element 2 at a section located radially outward of the locking edge 11 is t1, while the thickness of the element 2 at a section located radially inward of the locking edge 11 is t2 which is smaller than t1. The thickness corresponds to the distance between the front and rear surfaces 2a, 2b.

The inclination angle θ1 is set larger than the relative inclination angle θ3 (in FIG. 4) of the adjacent elements 2, 2 which relative inclination angle is obtained when the belt 1 is passed or partly wound on the pulley at the smallest passed-on radius r in all passed-on radiuses obtained throughout the whole transmission ratio range. The relative inclination angle θ3 is to be formed between the facing front and rear radially outward faces F, R of the adjacent elements 2, 2. The thickness t2 at the radial level of the locking edge 7 is the same as that t2 of the first embodiment as shown in FIG. 3.

Also in this embodiment, during operation of the belt 1 at any transmission ratio, the effective thickness of each element 2 of the bent state section of the belt 1 becomes t2 because the adjacent elements 2, 2 are contacted with each other in a manner that the locking edge 7 of one element is in contact with the depressed face 15 of another element. Thus, the effective thickness t2 at the bent state section of the belt 1 is smaller than that t1 at the straight state section of the belt 1, and therefore the circumference of the circularly arranged elements 2 increases proportionally to the number of the elements of the straight state section of the belt 1, thereby reducing the clearance formed owing to the initial clearance Cs and extension of the laminated ring 3.

Figure 9:
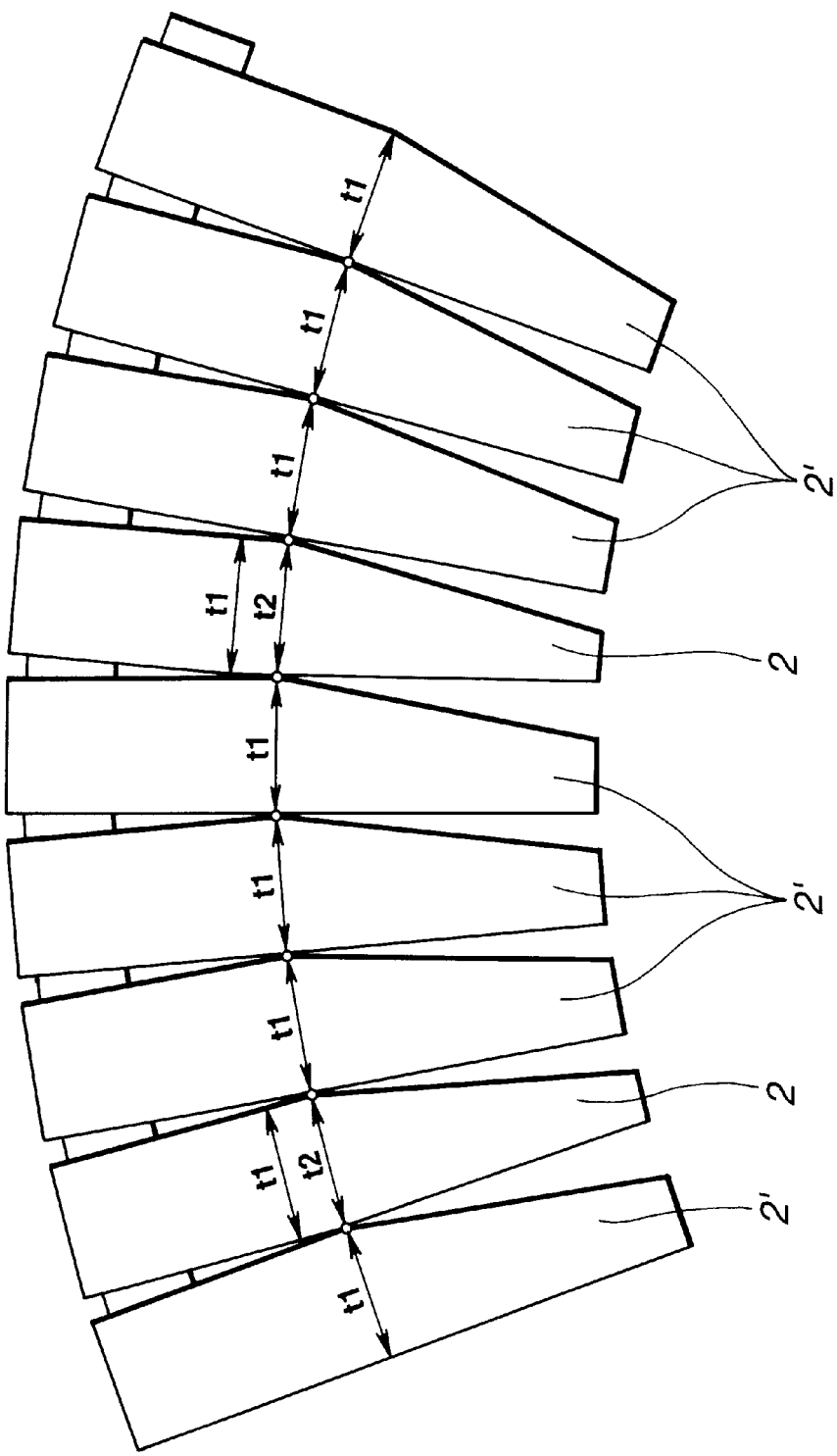
FIG. 9 is a fragmentary side view of a third embodiment of the belt for the continuously variable transmission, according to the present invention.

FIG. 9 illustrates a third embodiment of the belt 1 according to the present invention, which is similar to the first embodiment belt 1 shown in FIGS. 1 to 4. More specifically, the belt 1 of this embodiment comprises first elements 2' and second elements 2. Each first element 2' corresponds to the element 2' of the conventional belt 1' shown in FIGS. 11 to 15B. Each second element 2 corresponds to the element 2 of the first embodiment as shown in FIGS. 1 to 4. In this embodiment, each second element 2 is inserted between the adjacent first elements 2' at predetermined intervals in the peripheral or longitudinal direction of the laminated ring 3.

Next, a manner of operation of the belt 1 of this embodiment will be discussed on the following assumption:

a) the circumference of the inner peripheral surface of the inner-most annular sheet 3n of the laminated ring 3 is 700 mm;

b) the radial distance between the inner peripheral surface of the inner-most annular sheet 3n and the locking edge 7 is 1.0 mm;

c) the thickness (t1) of each element is 2.0 mm; and d) the thickness (t2) of each element is 1.9 mm.

When the belt 1 comprising the first and second elements 2', 2 is assembled, the initial clearance Cs is produced between the elements, in which the elements having the effective thickness of t1 and the effective thickness of t2 are mixedly disposed. In case of FIG. 6, each second element 2 whose effective thickness is changeable between t1 and t2 is disposed at intervals of three first elements 2'.

Here, a concrete calculation for obtaining the initial clearance Cs produced in the belt 1 will be made on the assumption that the number of the elements 2', 2 is 20. The total number of the elements 2', 2 which can be assembled in the belt 1 is given by the following:

$$((700-2\times1\times\pi)-20\times1.9)\div2.0+20=347.858,$$

in which the number of the elements 2 must be an integer and therefore the total number is 347.

When the elements 2 of this total number are assembled into the belt 1, the initial clearance Cs given by the following equation is produced between the adjacent elements 2, 2:

$$(700-2\times1\times\pi)-(347-20)\times2.0-20\times1.99=1.72 \text{ (mm)}.$$

Accordingly, the initial clearance Cs of 1.72 mm is produced between the elements. Additionally, another clearance is produced owing to extension of the laminated ring 3. In this regard, the total clearance of about 2.7 mm is produced between the elements on the assumption that the laminated ring 3 makes its extension of about 1 mm under tension applied to the belt 1 in case that the belt 1 is passed on the drive and driven pulleys 12, 13 to accomplish power transmission.

Here, during operation of the belt 1 as shown in FIG. 12, the belt 1 includes its sections in a bent state upon being wound on the drive or drive pulley 12, 13, and its sections in a straight state upon lying between the drive and driven pulleys 12, 13. The plural elements 2 are contained in each section of the belt 1 in the bend or straight state. In this regard, the ratio between the number of the elements 2 in the bent state sections of the belt 1 and the number of the elements 2 in the straight state sections of the belt 1 will be calculated on the assumption that the distance between the axes of the drive and driven pulleys 12, 13 is 160 mm, and a range of the transmission ratio obtainable by the belt 1 is from 0.4 (at the highest transmission ratio) to 2.4 (at the lowest transmission ratio):

(the number of the elements in the bent state sections the number of the elements in the straight state sections)= (152:196) to (160:188).

Accordingly, the ratio of the elements 2 (the total number: 20) is (the number of the elements in the bent state sections the number of the elements in the straight state sections)≈(9:11).

It will be understood that the effective thickness (or the pitch between the adjacent working locking edges) of each element in the straight state sections of the belt 1 is t1 as seen from FIG. 3. Accordingly, the effective thickness of the totally nine elements in the straight state section increases from t2 (1.99 mm) to t1 (2.0 mm), and therefore an increased amount in circumference (at the radial level of the working locking edge) of the whole belt 1 due to the increase in the effective pitch is calculated as follows:

$$(t1-t2)\times9=0.1\times9=0.9 \text{ mm}.$$

Thus, the clearance between the element reduces by about 0.9 mm, in which such effects are slightly different in accordance with the transmission ratios.

In contrast, in the conventional belt 1' as disclosed in Japanese Patent Provisional Publication No. 55-100443, only one locking edge is formed to provide only one effective pitch of each element of the belt 1'. Accordingly, the circumference of the belt 1' (at the radial level of the locking edge) never changes between during assembly of the belt 1' as shown in FIG. 11 and that during operation of the belt 1' as shown in FIG. 12, so that the initial clearance Cs and the clearance corresponding to the extension amount of the laminated ring 3 are always appeared between the elements during the operation of the belt 1'.

Thus, even in case that the clearance of about 2.7 mm is produced between the elements in the conventional belt 1', the belt 1 of this embodiment can reduce the clearance (to be produced between the elements 2) to about 0.6 mm (=2.7 mm−0.9 mm) which is referred to as a "clearance reduction amount", only by inserting a predetermined number of the elements 2 each having the two effective thicknesses t1, t2 into the aligned elements 2'. As a result, this embodiment makes it possible to improve the power transmission efficiency of the transmission and the durability of the belt 1, similarly to the first and second embodiments.

Figure 10:
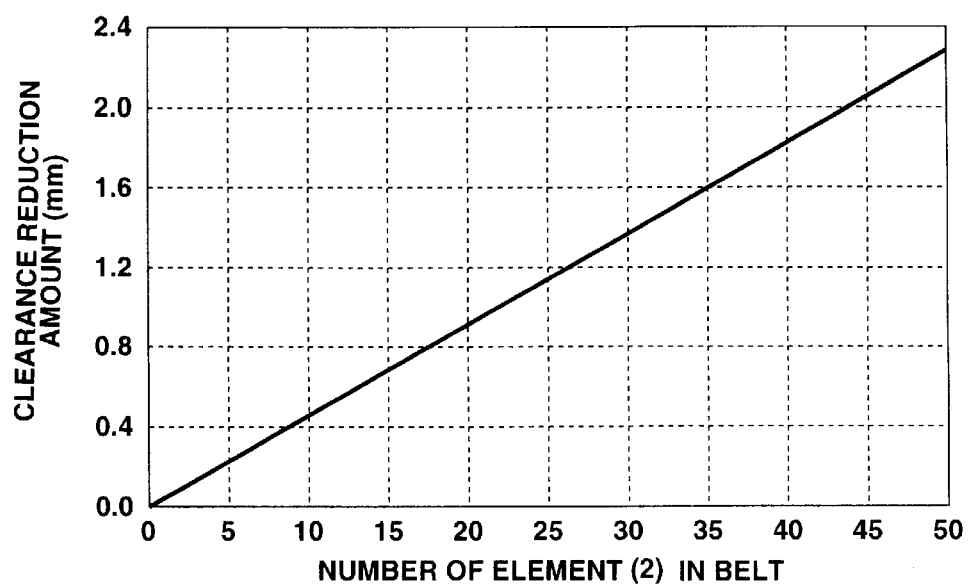
FIG. 10 is a graph showing the relationship between the number of elements (2) used in the belt and the clearance reduction amount in connection with the belt of FIG. 9.

FIG. 10 shows the relationship between the clearance reduction amount and the number of the elements 2 used in the belt 1, in the belt 1 according to the present invention. According to the graph of FIG. 10, the clearance reduction amount increases proportionally to the number of the elements 2 used in the belt 1, and therefore it is possible to obtain a value of the number (required to prevent a clearance from being produced between the elements) of the element to be used in the belt 1 from this graph if the initial clearance of the belt 1 and the extension amount of the laminated ring 3 during operation of the belt 1 have been known.

According to this embodiment, the elements 2 having the plural effective thicknesses t1, t2 are mixedly disposed among the elements 2' having a single effective thickness t1, at generally equal distances in the peripheral direction of the belt 1. As a result, the amount of the clearance produced between the elements during operation of the belt 1 can be readily controlled by changing the number of the elements 2 to be used in the belt 1, thereby making it possible to suppress slip of the belt 1 relative to the pulley 1.

Industrial Applicability

The present invention can effectively improve the durability of a belt to be used in a continuously variable transmission of the type wherein the belt is passed on drive and driven pulleys, while improving a power transmission efficiency of the transmission.

I claim:

1. A belt for a continuously variable transmission, comprising:
a rigid ring; and
a plurality of rigid elements, each having a thickness, supported on said ring and aligned in a peripheral direction of said ring to be adjacent to each other, each element having:
first and second surfaces respectively facing forward and rearward of the element in a direction of rotation of said ring;
a first locking edge formed at said first surface; and
a second locking edge formed at said second surface,
wherein said first and second surfaces of respective adjacent elements contact each other,
wherein said first surface includes a first inclined face formed radially inward of said first locking edge and extending radially inward from said first locking edge so that the thickness of the element gradually decreases in a radially inward direction, and a first radially outward face formed radially outward of said first locking edge and extending radially outward from said first locking edge,
wherein said second surface includes a second face formed radially inward of said locking edge and extending radially inward from said second locking edge, and a second radially outward face extending radially outward of said second locking edge and extending radially outward from said second locking edge, said second face being depressed relative to said second radially outward face so that the thickness of said element is smaller at the second face than that at the second radially outward face,
wherein said second locking edge is located radially outward of said first locking edge and contacts the first surface of said adjacent element, and
wherein adjacent elements are inclined relative to each other, and
wherein the first inclined face of said first element is inclined by a first inclination angle relative to a plane containing the first radially outward face of said first surface, said first inclination angle being larger than a second relative inclination angle formed between the first and second radially outward faces of said respective adjacent elements.

2. A belt for a continuously variable transmission, comprising:
a rigid ring; and
a plurality of rigid elements, each having a thickness, supported on said ring and aligned in a peripheral direction of said ring to be adjacent to each other, each element having:
first and second surfaces respectively facing forward and rearward of the element in a direction of rotation of said ring;
a first locking edge formed at said first surface; and
a second locking edge formed at said second surface,
wherein said first and second surfaces of the respective adjacent elements contact each other,
wherein said first surface includes a first inclined face formed radially inward of said first locking edge and extending radially inward from said first locking edge so that the thickness of the element gradually decreases in a radially inward direction, and a first radially outward face formed radially outward of said first locking edge and extending radially outward from said first locking edge,
wherein said second surface includes a second face formed radially inward of said second locking edge and extending radially inward from said second locking edge, and a second radially outward face formed radially outward of said second locking edge and extending radially outward from said second locking edge, said second face being depressed relative to said second radially outward face so that the thickness of said element is smaller at the second face than that at the second radially outward face, said second locking edge being located radially outward of said first locking edge and contactable with the first surface of said adjacent element the adjacent ones of said elements being inclinable relative to each other so that said belt is smoothly passed on pulleys of the continuously variable transmission,
wherein the depression of the second face of each of said plurality of rigid elements is a stepped face which is depressed relative to the second radially outward face such that the first locking edge of each element contacts the second depressed face of another adjacent element.

3. A belt for a continuously variable transmission, comprising:

a rigid ring;

a plurality of rigid first elements, each having a first thickness, supported on said ring and aligned in a peripheral direction of said ring to be adjacent to each other, each first element having:

first and second surfaces facing forward and rearward of the first elements in a direction of rotation of said ring and contacting each other, a first locking edge formed at said first surface, said first surface including a first inclined face formed radially inward of said first locking edge and extending radially inward from said first locking edge so that the first thickness gradually decreases in a radially inward direction, and a first radially outward face formed radially outward of said first locking edge and extending radially outward from said first locking edge, a second locking edge formed at said second surface, said second surface including a second face formed radially inward of said second locking edge and extending radially inward from said second locking edge, and a second radially outward face formed radially outward of said second locking edge and extending radially outward from said second locking edge, said second face being depressed relative to said second radially outward face so that the first thickness is smaller at the second face than that at the second radially outward face, said second locking edge being located radially outward of said first locking edge and in contact with the first surface of said adjacent first element, the adjacent ones of said first elements being inclined relative to each other, and a plurality of rigid second elements, each having a second thickness, supported on said ring and aligned in the peripheral direction of said ring to be adjacent to each other such that each of said first elements is disposed between said second elements at predetermined intervals, each second element having:

first and second surfaces respectively facing forward and rearward of the second elements in the direction of rotation of said ring, and a second element locking edge formed at said first surface of said second elements, wherein said first surface of said second elements includes: an inclined face formed radially inward of said second element locking edge and extending radially inward from said second element locking edge so that the second thickness of each second element gradually decreases in a radially inward direction; and a radially outward face formed radially outward of said first locking edge of said second elements and extending radially outward from said second element locking edge, wherein the first and second locking edges of said first element contact the second surface of the adjacent second element and the first surface of the other second element adjacent to the first element.

4. A belt as claimed in claim 3, wherein the depression of the second face of said first elements is a second inclined face which inclines by a second inclination angle relative to a plane containing the second radially outward face of said second radially outward face so that the thickness of said first element gradually decreases in the radially inward direction, said inclination angle being smaller than a first relative inclination angle formed between the first and second radially outward faces of the respective adjacent elements.

5. A belt for a continuously variable transmission, comprising:

a rigid ring; and a plurality of rigid elements, each having a thickness, supported on said ring and aligned in a peripheral direction of said ring to be adjacent to each other, each element having:

first and second surfaces respectively facing forward and rearward of the element in a direction of rotation of said ring and contacting each other, a first locking edge formed at said first surface, said first surface including a first inclined face formed radially inward of said first locking edge and extending radially inward from said first locking edge so that the thickness of the element gradually decreases in a radially inward direction, and a first radially outward face formed radially outward of said first locking edge and extending radially outward from said first locking edge, and a second locking edge formed at said second surface, said second surface including a second face formed radially inward of said second locking edge and extending radially inward from said second locking edge, and a second radially outward face formed radially outward of said second locking edge and extending radially outward from said second locking edge, said second face being depressed relative to said second radially outward face so that the thickness of said element is smaller at the second face than that at the second radially outward face, said second locking edge being located radially outward of said first locking edge and in contact with the first surface of said adjacent element, the adjacent ones of said elements being inclined relative to each other, wherein the depression of the second face of each of said plurality of rigid elements is a second inclined face which inclines by a second inclination angle relative to a plane containing the second radially outward face of said second surface so that the thickness of each of said plurality of rigid elements gradually decreases in the radially inward direction, said second inclination angle being smaller than a first relative inclination angle formed between the first and second radially outward faces of said respective adjacent elements.

6. A belt as claimed in claim 5, wherein said ring includes a plurality of endless steel sheets, wherein each element is formed of steel.

7. A continuously variable transmission comprising:

a drive pulley having a first wheel counterpart adapted to receive power from an engine;

a driven pulley coupled to the drive pulley and having a second wheel counterpart adapted to transmit power;

a belt for transmitting power from the drive pulley to the driven pulley and including:

a rigid ring; and a plurality of rigid elements, each having a thickness, supported on said ring and aligned in a peripheral direction of said ring to be adjacent to each other, each element having:

a first surface facing forward of the element in a direction of rotation of said rigid ring;

a second surface facing rearward of the element in a direction of rotation of said rigid ring and contacting said first surface;

a first locking edge formed at said first surface; and a second locking edge formed at said second surface radially outward of said first locking edge and in contact with the first surface of said adjacent element, wherein said first surface includes a first inclined face formed radially inward of said first locking edge and extending radially inward from said first locking edge so that the thickness of the element gradually decreases in a radially inward direction, and a first radially outward face formed radially outward of said first locking edge and extending radially outward from said first locking edge, and wherein said second surface includes a second face formed radially inward of said second locking edge and extending radially inward from said second locking edge, and a second radially outward face formed radially outward of said second locking edge and extending radially outward from said second locking edge, said second face having a depression relative to said second radially outward face so that the thickness of said element is smaller at the second face than that at the second radially outward face, wherein each element is inclined relative to its adjacent element so that said belt smoothly passes on the drive and driven pulleys, wherein the depression of the second face of each of said plurality of rigid elements is a second inclined face which inclines by a second inclination angle relative to a plane containing the second radially outward face of said second surface so that the thickness of each of said plurality of rigid elements gradually decreases in the radially inward direction, said second inclination angle being smaller than a first relative inclination angle formed between the first and second radially outward faces of said respective adjacent elements as the belt passes over the drive and driven pulleys.

8. A belt as claimed in claim 7, wherein each element has first and second side edge faces which are opposite in an axial direction of the drive and driven pulleys, said first and second edge faces are inclined relative to a plane perpendicular to an axis of each pulley, wherein the first and second wheel counterparts respectively have first and second frustonconical surfaces, wherein at least one of said first and second wheel counterparts is axially movable, and wherein the first and second side edge faces of each element contact the first and second frustoconical surfaces.

* * * * *